(12) United States Patent
Zheng et al.

(10) Patent No.: US 11,326,977 B2
(45) Date of Patent: May 10, 2022

(54) EFFICIENT METHOD FOR LOCALIZING LEAKS IN WATER SUPPLY PIPE NETWORK BASED ON VALVE OPERATIONS AND ONLINE WATER METERING

(71) Applicant: ZHEJIANG UNIVERSITY, Hangzhou (CN)

(72) Inventors: Feifei Zheng, Hangzhou (CN); Yuan Huang, Hangzhou (CN); Qingzhou Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 149 days.

(21) Appl. No.: 17/006,925

(22) Filed: Aug. 31, 2020

(65) Prior Publication Data
US 2021/0148782 A1 May 20, 2021

(30) Foreign Application Priority Data
Nov. 19, 2019 (CN) .......................... 201911134761.5

(51) Int. Cl.
*G01M 3/28* (2006.01)
*F17D 5/02* (2006.01)
*E03B 7/07* (2006.01)

(52) U.S. Cl.
CPC ............ *G01M 3/2807* (2013.01); *E03B 7/071* (2013.01)

(58) Field of Classification Search
CPC ........ G01M 3/00; G01M 3/28; G01M 3/2807; F17D 5/00–02; E03B 7/07; E03B 7/071
See application file for complete search history.

(56) References Cited

U.S. PATENT DOCUMENTS

| | | | |
|---|---|---|---|
| 9,470,601 B1 | 10/2016 | Chaudhary et al. | |
| 10,242,414 B2 * | 3/2019 | Scolnicov | G01M 3/28 |
| 2009/0299660 A1 * | 12/2009 | Winter | G01M 3/28 |
| | | | 73/40 |

FOREIGN PATENT DOCUMENTS

| | | |
|---|---|---|
| CN | 1369663 A | 9/2002 |
| CN | 102072407 A | 5/2011 |

(Continued)

OTHER PUBLICATIONS

International Search Report (PCT/CN2019/121559); dated Jun. 29, 2020.

*Primary Examiner* — Nguyen Q. Ha
(74) *Attorney, Agent, or Firm* — W&G Law Group

(57) ABSTRACT

The present disclosure belongs to the field of municipal engineering and urban water supply network, and provides an efficient method for localizing leaks in a districted metering area (DMA) of water supply pipe networks based on valve operations and online water metering, which is implemented in multiple stages to gradually reduce the leaking area. At each stage, the DMA is firstly decomposed into two sub-areas using an optimized valve operation strategy determined by a minimized objective function, wherein a graph theory-based method is used for the solution. Then the sub-areas containing leaks are identified through online water balance analysis based on smart demand meters, thereby reducing the leaking area. The minimum leaking area is identified with the least number of valve operations. Compared with the traditional methods, the method of the present disclosure can obviously improve the efficiency and accuracy of leak localization and is easy to implement.

3 Claims, 5 Drawing Sheets

(56) References Cited

FOREIGN PATENT DOCUMENTS

| CN | 105927863 A | 9/2016 |
| CN | 106959608 A | 7/2017 |
| CN | 107230021 A | 10/2017 |
| CN | 109827080 A | 5/2019 |
| CN | 109869638 A | 6/2019 |

* cited by examiner

EFFICIENT METHOD FOR LOCALIZING LEAKS IN WATER SUPPLY PIPE NETWORK BASED ON VALVE OPERATIONS AND ONLINE WATER METERING

TECHNICAL FIELD

The present disclosure relates to the field of municipal engineering and urban water supply pipe network, and specifically, to an efficient method for localizing leaks in a water supply pipe network based on valve operations and online water metering.

BACKGROUND

Leakage is one of the common problems in the operation of an urban water supply, network in China. According to the survey statistics in Statistical Yearbook of Urban Water Supply (2017), the leaking amount from pipe networks in major provinces and cities in China accounts for about 8%-50% of the total amount of water supply. Leakage of a pipe network not only wastes water resources and energy seriously, but also causes potential safety hazards of drinking water. Therefore, leak detection and localization in a water supply network has always been one of the important tasks for water utilities, which is of great significance for saving water resources and ensuring the safety of water supply. Water utilities usually use professional equipment to find leaks, such as listening rods, leaking noise correlation instruments, ground penetrating radar and so on. However, this kind of equipment-based method generally has the problems of high cost, heavy workload and low efficiency, and is only suitable for accurate localization of leaks within a limited area. Considering this, an economical and effective implementation strategy of leak localization is to reduce the leaking area by other leak localization methods, and then use an equipment-based method to pinpoint the leaking spots accurately within the determined leaking area.

In recent years, with the rapid development of the intelligent technology, intelligent equipment, such as smart demand meters, remote control valves and so on, have been widely used in water supply pipe networks. Smart demand meters can collect, store and transmit the data of water consumptions at end users in real time, thus enabling accurate metering of water consumptions online in the pipe network. It provides a new opportunity for developing efficient leak localization methods to minimize the leaking area, which can make up for the deficiencies of the existing leak localization methods.

The international water association (TWA) recommends the district metering area (DMA) method for leakage monitoring and leak localization. That is, a complex water supply network is divided into several relatively small DMAs, and the flow changes of each DMA are measured independently to judge whether there exist leaks within the DMAs. Generally speaking, when the minimum night flow of a DMA is obviously abnormal (for example, the value exceeds a predetermined threshold), it means that a new leak appears in the DMA. However, this method can only identify the leaking area to the DMA level (usually including pipelines of tens of kilometers), but cannot accurately determine the leak location in the DMA. In order to further reduce the leaking area for the ease of using equipment to pinpoint leak locations, researchers and engineers have developed various methods such as transient-based methods, optimization-based methods and data-driven methods. This kind of methods can effectively reduce the leaking area in theory, but there are still some obvious problems in practical applications. On the one hand, this kind of methods usually needs to establish a high-precision hydraulic model or obtain a large number of accurate measurement data, which are difficult for some water utilities. On the other hand, this kind of methods often exhibit equifinality and low-reliability issues in practical applications, especially for highly looped and complex networks. Therefore, it is still necessary to further develop practical, efficient and effective leak localization methods.

SUMMARY

In view of the lack of practicability and effectiveness of the above proposed leak localization methods, the present disclosure provides an efficient method for localizing leaks in water supply pipe networks based on valve operations and online water metering, which can accurately and efficiently identify the leaking area in a district metering area (DMA) and is easy to implement.

To solve the above technical problems, the present disclosure adopts the following technical solution:

1. An efficient method for localizing leaks in water supply pipe networks based on valve operations and online water metering, wherein, existing valves in a DMA are decomposed into two sub-areas by closing valves following an optimal strategy, and the sub-area containing leaks is identified from online water balance analysis based on smart demand meters, thereby reducing the area containing leaks; the strategy of combining valve operations with water balance analysis is repeatedly implemented (i.e., continuously implementing for multiple stages) to gradually reduce the leaking area until no valve operations can further reduce the leaking area.

In the above technical solution, the method further comprises the following steps:

1. using a graph theory-based method to find out valve closing strategies $V_s=\{v_1, v_2, \ldots, v_N\}$ that can decompose the DMA into two sub-areas, which form a set $V=\{V_1, V_2, \ldots, V_S\}$; wherein, N is a total number of operable valves in the DMA, and S is a total number of obtained valve closing strategies; $v_n \in \{0,1\}$ represents the state of a valve n, 0 indicating being closed, and 1 indicating being open; decomposing the DMA into two sub-areas by the valve closing strategies $V_s$, which may be expressed as $G=G_1(V_s) \cup G_2(V_s)$, in which G is the graph of the DMA, vertices in the graph represent node elements (such as end users, pipe connections, fire hydrants, etc.) in the pipe network, edges represent link elements (such as pipe sections, valves, pumps, etc.) in the pipe network, and $G_1$ and $G_2$ represent the two sub-areas decomposed by closed valves of a valve closing strategy;

2. initiating the leak localization by marking all pipes in the DMA as potential leaking pipes and setting the current stage of leak localization as k=1; leaks are assumed to locate at pipe sections with $x_m=1$ representing the pipe section potentially have leaks and $x_m=0$ representing no leaks exist at the pipe section; wherein, m=1, 2, ... M, M represents the total number of pipe sections in the DMA, and the cases of leaks at other components connected with the pipe sections are equivalent to those of leaks at pipe sections;

3. determining an optimal valve operation strategy at the current stage k by establishing an optimized objective function as follows, minimization:

$$F^k = w_1 \frac{\sum_{n=1}^{N} |v_n^k - v_n^{k-1}|}{N} + w_2 \frac{\left|\sum_{i=1}^{G_1^P(V^k)} x_i^{k-1} L_i - \sum_{j=1}^{G_2^P(V^k)} x_j^{k-1} L_j\right|}{\sum_{m=1}^{G(P)} L_m} \quad (1)$$

constraints:

valve closing strategy: $v_n^k \in \{0,1\} n=1,2,\ldots,N$ (2)

decomposing the DMA into two sub-areas: $G=G_1(V^k) \cup G_2(V^k)$ (3)

pressure constraints at uninterrupted users: $H_u(V^k) \geq h_u^{min}$ (4)

where, $\sum_{n=1}^{N}|v_n^k-v_n^{k-1}|$ represents the number of valve operations at the current stage k (relative to the valve state at the previous stage k−1), including valve opening and closing; $\sum_{n=1}^{N}|v_n^k-v_n^{k-1}|/N$ represents normalization of valve operations; $L_m$ represents the length of the pipe section m; $|\sum_{i=1}^{G_1^P(V^k)} x_i^{k-1} L_i - \sum_{j=1}^{G_2^P(V^k)} x_j^{k-1} L_j|$ represents the length difference between the potential leaking pipes in the two sub-areas decomposed by the valve closing strategy $V^k$, $\sum_{m=1}^{G(P)} L_m$ represents the total length of the pipe section in the DMA; $|\sum_{i=1}^{G_1^P(V^k)} x_i^{k-1} L_i - \sum_{j=1}^{G_2^P(V^k)} x_j^{k-1} L_j|/\sum_{m=1}^{G(P)} L_m$ represents the normalization of the length difference; and $w_1$ and $w_2$ represent weights of the number of valve operations and the length difference between the potential leaking pipes in the two sub-areas, respectively. The present disclosure adopts $w_1=w_2=0.5$ so as to equally consider the weights of the two terms.

Equation (2) represents the decision variable of the objective function, that is, the operating state $v_n^k$ of each valve in the stage k, equation (3) represents that the DMA should be decomposed into two sub-areas by the valve closing strategy, and the set of valve closing strategies V obtained in step 1 is the feasible solutions that satisfy the constraint of equation (3). Equation (4) indicates the pressure constraints for the users for whom water supply cannot be interrupted during the method implementation, that is, the pressures $H_u(V^k)$ at these nodes will not be lower than the required minimum pressure $h_u^{min}$ after the valve operation, so as to ensure the continuous water supply for these users. When applying equation (4), the hydraulic model of a water supply network should be used to judge whether the pressure constraints are satisfied.

Equation (1) indicates that the optimization objective is to minimize the number of valve operations and the length difference between the potential leaking pipes in the two sub-areas. The physical meaning of this objective function is to decompose a DMA with the least number of valve operations at the current stage, and to equally divide the length of the potential leaking pipes as much as possible. Reducing the number of valve operations can reduce the workload of leak localization; averaging the length of the potential leaking pipes (i.e. a traditional dichotomy) can reduce the number of implementation stages required for leak localization, thus improving the efficiency of leak localization. The valve closing strategy set V obtained in the first step is used to evaluate the defined optimization objective function (Equation 1), and the valve closing strategy that satisfies the constraint condition (Equation 4) and has the smallest objective function value is selected as the optimal valve closing strategy in the current stage k.

4. closing or opening the valves according to the optimal valve closing strategy, and decomposing the DMA into two sub-areas; for the two sub-areas, one should contain at least one inlet of the DMA (that is, the sub-area functions normally), the other one may function normally or may be isolated by closed valves (i.e.; water supply is interrupted). As the method of the present disclosure is required to be implemented at the night flow period when the water consumption is at minimum level, short interruption of water supply will not have obvious influence.

5. optionally selecting a sub-area that functions normally to perform online water balance analysis, in order to identify whether this sub-area has leaks. If it is identified having no leaks, the leaks are located at another sub-area. The online water balance analysis is implemented through boundary flowmeters of the DMA and smart demand meters at end users; the difference between the flow (the online flow meter readings at inlets minus the online flow meter readings at outlets) entering the selected sub-area and user's water consumptions (the sum of online readings of smart demand meters) in the selected sub-area, that is, non-revenue water (NRW), which can indicate whether there exist leaks in the selected sub-area; if the value of NRW of the selected sub-area is similar to that of the NRW of the DMA before leak localization, it indicates there are leaks in the selected sub-area; otherwise, the leaks locate in another sub-area;

6. updating the potential leaking pipes of the current stage k by marking the pipe sections in the sub-area that has been identified having no leaks as pipe sections with no leaks (that is, $x^k=0$), so as to reduce the leaking area;

7. judging whether there is any valve operation in the DMA to further reduce the leaking area, if so, returning to step 3 for the next stage of leak localization (that is, k=k+1); otherwise, which indicates that a minimum leaking area has been identified, terminating the leak localization procedure. The minimum leaking area identified by, the present disclosure is the pipe sections marked as 1 in the DMA and its connected components when the leak localization procedure terminates.

8. dispatching workers to accurately pinpoint the leak locations in the identified leaking area and then repair the localized leaks.

Furthermore, the step 1 specifically comprises the following steps:

(1) removing all edges representing valves in the pipe network graph G, and identifying all connected subgraphs in the generated new graph, wherein the subgraphs represent the smallest areas in the pipe network that can be isolated by closing valves (including nodes, pipe sections, fire hydrants, etc.), which is also the minimum leaking area that can be located by the method of the present disclosure.

(2) transforming the pipe network graph G into a new alternative graph Gr; wherein the valves in the pipe network are taken as edges and all the connected subgraphs identified in step (1) as vertices, and the new alternative graph $G_V$ s constructed according to the topological connection relationship between the valves and the connected subgraphs;

(3) determining cut sets of the alternative graph $G_V$, wherein each cut set represents a valve closing strategy $V_s$, and edges in the cut set represent valves to be closed in the valve closing strategy, namely, $v_n=0$; forming a set of valve closing strategies V by converting each cut set into a valve closing strategy.

Furthermore, in the step (3), the cut sets of the alternative graph $G_V$ are determined by the Contraction algorithm of the Karger algorithm, specifically by: randomly selecting an edge in the graph to be removed, merging two endpoints of the edge, and reserving other connecting edges of the endpoints; repeating the process until there are only two vertices left in the graph, at which time the connecting edge of these two remaining endpoints is a cut set of the graph; obtaining a sufficient number of cut sets by repeatedly executing the Contraction algorithm for $t^4$ log t times is the total number of vertices in the graph $G_V$).

The present disclosure can obviously reduce the leaking area and improve the efficiency of leak localization as well as ensuring the accuracy of leak localization. In addition, the leak localization method of the present disclosure requires implementation in the night flow period, such as 02:00-05:00, to reduce the interruption to the user's water consumptions in the DMA.

The Beneficial Effects of the Present Invention are:

1. This method can use the least number of valve operations to determine the smallest leaking area (the smallest area that can be identified by closing valves, usually, less than 5.0 km), and the localization efficiency is high. Compared with the traditional method using listening rods, the method of the present disclosure can increase the leak localization efficiency by 15-20 times.

2. Compared with the problem of insufficient accuracy of many leak localization methods, this method gradually narrows down the leaking area by optimizing valve operations and online water balance analysis to ensure the accuracy of leak localization.

3. The method only needs to operate valves and perform water balance analysis (which can be mastered by ordinary technicians), without relying on hydraulic models or complex data analysis, and is easy to implement in real pipe networks.

DESCRIPTION OF EMBODIMENTS in order to make the leak localization method of the present disclosure easy to understand, the technical solution of the present disclosure will be described clearly and completely with reference to the drawings and specific embodiments. Obviously, the described embodiments are only some embodiments, rather than all embodiments, of the present application. Based on the embodiments in this application, all other embodiments obtained by ordinary skilled persons in this field without creative work belong to the protection scope of this application.

Figure 1:
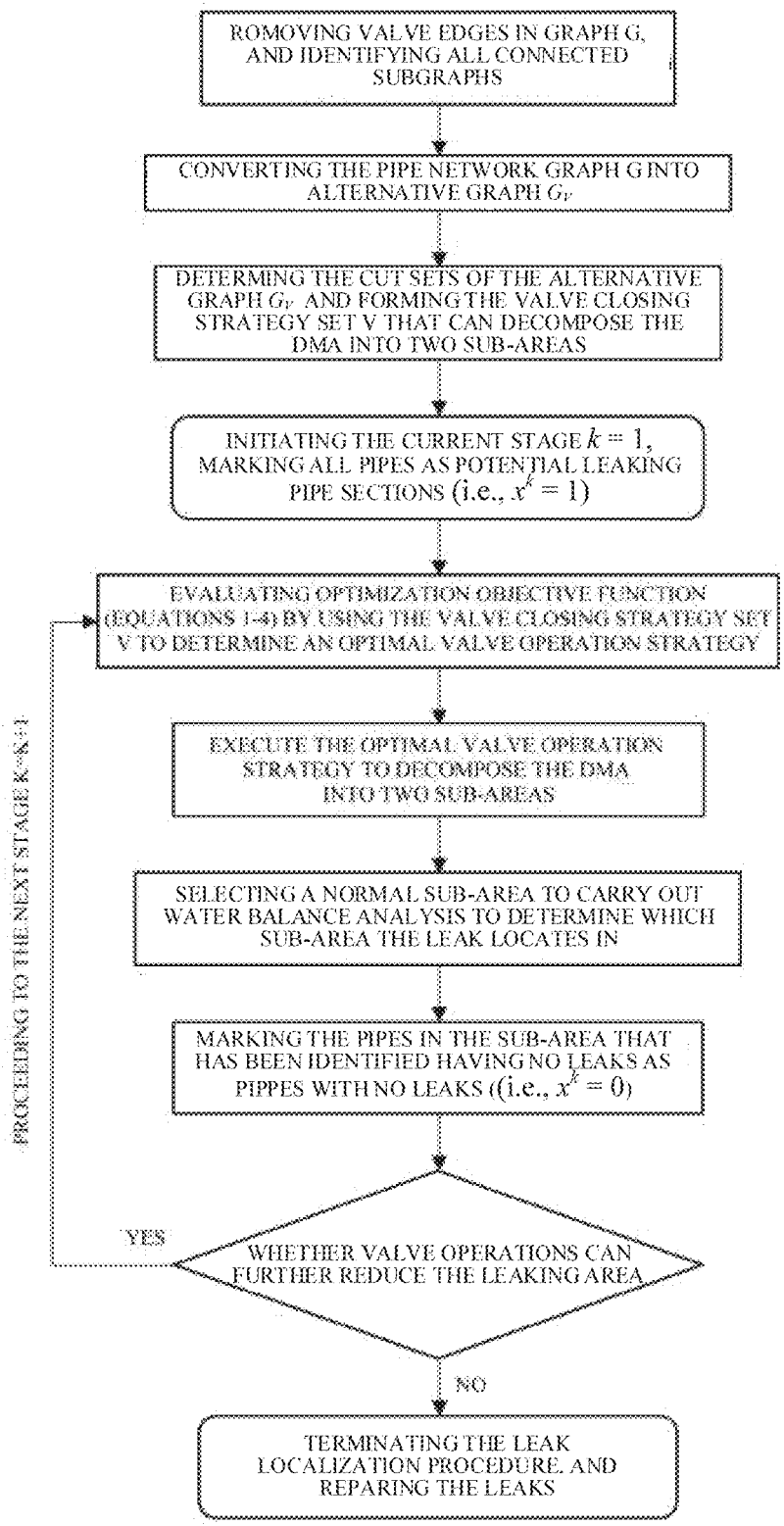
FIG. 1 is an implementation roadmap of the method of the present disclosure.

FIG. 2(a) shows a simple DMA pipe network, including 2 inlets, 1 outlet, 5 valves (V1, V2, V3, V4 and V5), and several pipe sections and nodes. According to the present disclosure, the following specific implementation steps are adopted to localize the leak, as shown in FIG. 1.

At Step 1, a DMA pipe network is taken as a pipe network graph G (pipe segment and valve are edges and nodes are vertices), valve edges in graph G are removed, and all connected subgraphs in the graph are identified. For the example in FIG. 2(a), five connected subgraphs are identified; which are respectively represented by S1, S2, S3, S4 and S5, as shown in FIG. 2(b). Each connected subgraph represents a set of pipe network components that can be divided by closing valves.

At Step 2, the pipe network graph G is converted into an alternative graph $G_V$ (the valves are the edges and the connected subgraphs are the vertices). For the example in FIG. 2(a), the generated alternative graph is shown in FIG. 2(c).

Figure 2:
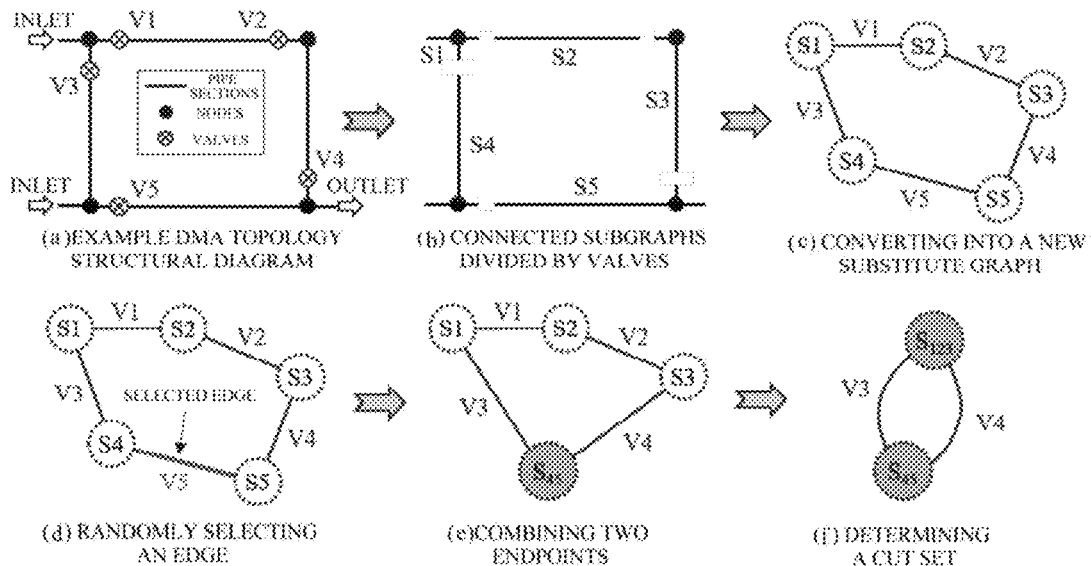
FIG. 2 is a schematic diagram of a graph theory-based method adopted by the present disclosure.

At Step 3, the Contraction algorithm is operated for $t^4$ log t times to determine the cut sets of the alternative graph $G_V$ (t is the total number of vertices of the graph), and form the valve closing strategy set V. For the alternative graph shown in FIG. 2(c), FIGS. 2(d-f) show the results of running the Contraction algorithm once. First; an edge is randomly selected to be removed (V5 in FIG. 2d); then, the vertices S4 and S5 at both ends of the selected edge are merged to generate a new vertex $S_{45}$ (FIG. 2e); once again, an edge is randomly selected to be removed and the vertices are merged until there are two vertices left, and a cut set of the alternative graph $G_V$ can be obtained (the cut set {V3, V4} as shown in FIG. 2f). After running the algorithm repeatedly for 1005 times; a set of the cut sets of the graph $G_V$ can be obtained by deleting the duplicate members in the cut sets. The edges in the set of cut sets are converted into closed valves to obtain a valve closing strategy set V.

Figure 3:
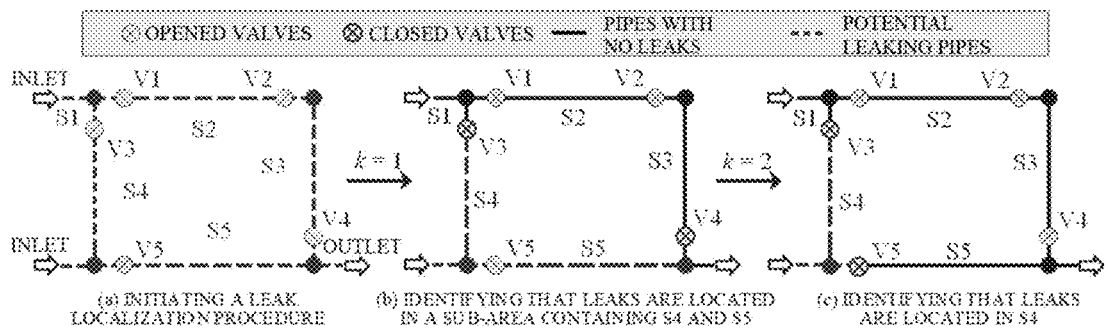
FIG. 3 is a schematic diagram of the multi-stage leak localization procedure of the present disclosure.

At Step 4, the leak localization procedure is initiated, the current stage k=1 is set, and all pipe sections are set as potential leaking pipe sections (i.e., $x^k=1$). FIG. 3(a) shows the initialization result, in which the pipe sections marked as dotted lines are the potential leaking pipe sections.

At Step 5, an optimal valve operation strategy at the current stage is determined. The optimization objective function $F^k$ (Equation 1) is evaluated by using the valve closing strategy set V determined in Steps 1-3, and the valve closing strategy which satisfies the constraint condition (Equation 4) and has the minimum objective function value $F^k$ is selected as the optimal solution. The optimal valve operation strategy at the current stage is determined by combining with the valve state in the current system. As shown in FIG. 3(b), the optimal valve operation strategy for the current stage k=1 is to close V3 and V4.

At Step 6, the optimal valve operation strategy is executed, and the DMA pipe network is decomposed into two sub-areas. As shown in FIG. 3(b), closing V3 and V4 decomposes the example DMA into two sub-areas, one of which contains S1, S2 and S3, and the other contains S4 and S5.

At Step 7, the sub-area containing a DMA inlet is optionally selected to perform online water balance analysis to determine which sub-area the leak is located in. For the two sub-areas in FIG. 3(b), one is optionally chosen to carry out water balance analysis, that is, measure the flow into the selected sub-area and the user's water consumptions in the selected sub-area through DMA inlet and outlet flow meters and smart demand meters, and calculate its non-revenue water NRW. If the NRW of the selected sub-area is similar to the NRW of the DMA, the leak is located in the selected sub-area. Otherwise, the leak is located in another sub-area. In order to continue the leak localization procedure, it is assumed that the water balance analysis results identify that the leak is located in the sub-area containing S4 and S5.

At Step 8, the pipe sections in the sub-area where no leak exists is marked as pipe sections with no leaks (i.e., $x^k=0$).

As shown in FIG. 3(b), the pipe sections inside S1, S2 and S3 are marked as pipe sections with no leaks.

At Step 9, whether there is any valve operation in the DMA that can further reduce the leaking area is determined. If yes, go back to step 5 to continue the next stage of leak localization (i.e., k=k+1); otherwise, the minimum leaking area has been found, stop the leak localization procedure. For the situation shown in FIG. 3(b), the area shown can be further reduced, and the process of leak localization at stage k=2 (the optimal valve operation is to open V4 and close V5) can be continued back to step 5 until the minimum leaking area is found (i.e., S4 in FIG. 3c).

At Step 10, according to the result of leak localization, workers are dispatched to the leaking area to find the exact location of leaks by using equipment methods such as listening rods and repair the found leaks.

The following describes the implementation steps and application effects of the present disclosure in combination with practical application scenarios. The following application scenarios are only used to illustrate how the present disclosure is applied in concrete practice, but are not used to limit the scope of the present disclosure.

Figure 4:
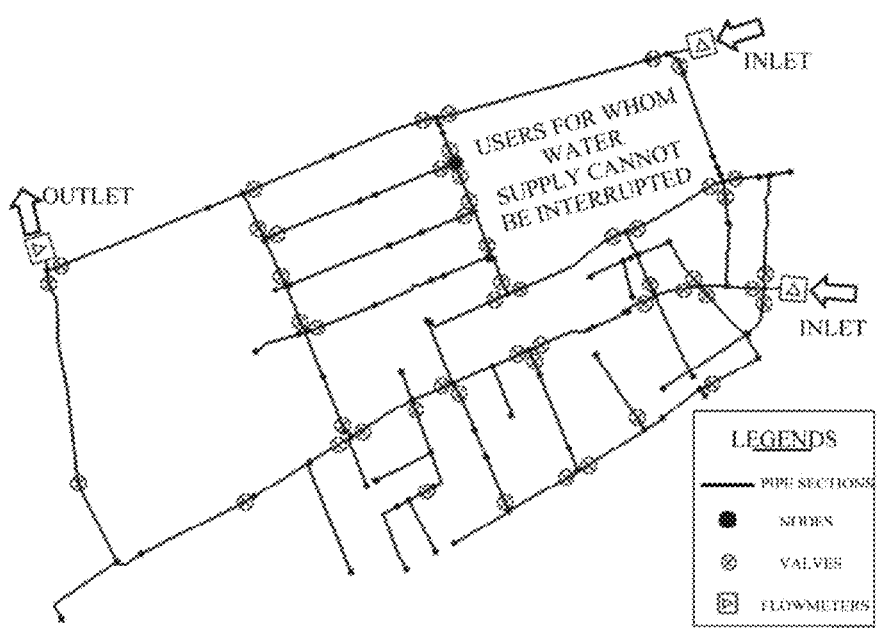
FIG. 4 is a pipe network topology diagram of a DMA according to an embodiment.

FIG. 4 shows a DMA area in a city water supply network, including 2 inlets, 1 outlet, 51 operable valves and a pipeline with a total length of 58.7 km. Remote flow meters are installed at the inlet and outlet of the DMA area to monitor the flow into and out of the DMA online, and smart demand meters are also installed at each user's place to record the user's water consumption online. In addition, there is an important industrial user in the DMA area, requiring uninterrupted water supply (node pressure should not be less than 15.0 m). The local water company conducts leakage management by continuously monitoring and analyzing the night flow of the DMA. When the minimum night flow rate of the DMA increases Obviously, it shows that new leaks occur in this area. In the following, taking an observed leakage event (the minimum nighttime flow rate increased from 76.5 L/s to 85.2 L/s) as an example, the method of the present disclosure is applied to locate the leak.

Figure 5:
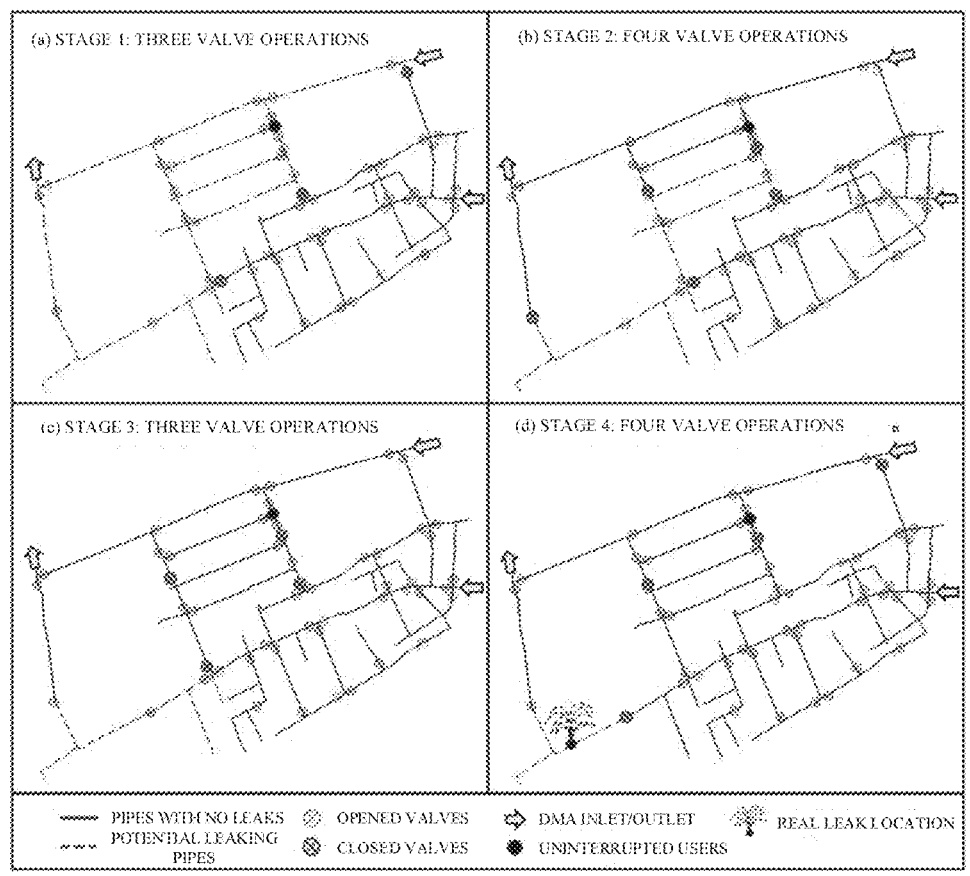
FIG. 5 is a valve operation diagram of each stage in the process of leak localization according to an embodiment.
Figure 6:
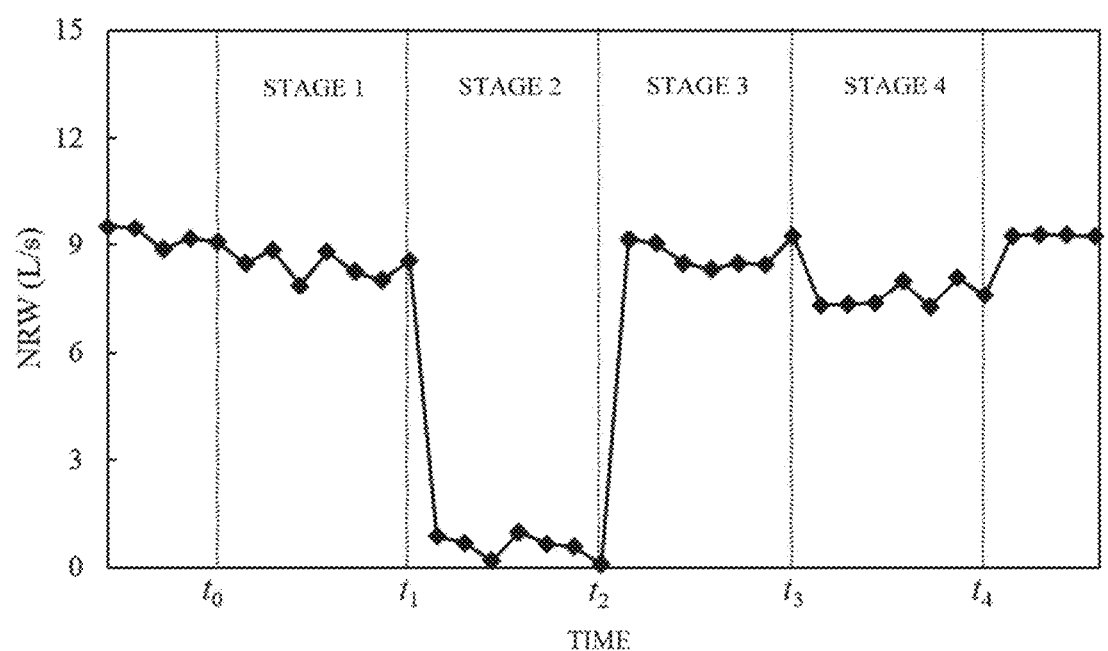
FIG. 6 is a graph of water balance analysis results in the process of leak localization according to an embodiment.

According to the above specific implementation, the leak generated in the example DMA is located, and the specific optimized valve operation and water balance analysis results are shown in FIG. 5 and FIG. 6 respectively. Firstly, the graph theory-based method is used to determine the valve closing strategy set which can decompose a DMA into two sub-areas (steps 1-3). The DMA pipe network graph can be divided into 40 connected subgraphs by valves, and 4,940 pipe network graph cut sets can be obtained by running the Contraction algorithm 9,400,000 times, thus forming a set with 4,940 valve closing strategies for solving the subsequent optimization objective function. Using steps 4-9, the leaking area can be gradually reduced until the smallest leaking area is obtained (pipe sections marked as dotted lines in FIG. 5d, with a total length of 4.3 km). For example, in stage 1 (time $t_0$-$t_1$), the DMA pipe network is divided into two sub-areas by three valve operations (closing three valves) (FIG. 5a), and the online water balance analysis of a sub-area including an outlet shows that its non-revenue water NRW is about 8.5 L/s (FIG. 6). The NRW of the DMA before the leak localization is about 9.0 L/s, which indicates that the leak is located in the sub-area containing the outlet, thus marking the pipe sections in another sub-area as pipe sections with no leaks. Similar steps are applied to subsequent stages 2-4 (time $t_1$-$t_4$), and water balance analysis is carried out in the sub-areas containing outlets.

Finally, the present disclosure can reduce the leaking area from 58.7 km to 4.3 km and improve the leak localization efficiency by about 13 times by applying 14 optimized valve operations and corresponding water balance analysis in 4 stages. After determining the minimum leaking area, the water company sends the staff to the identified leaking area for accurate leak localization, and confirms that the leak is located in the determined area (as shown in FIG. 5d). Therefore, an example application shows that the method provided by the present disclosure significantly improves the efficiency of leak localization and ensures the accuracy of leak localization.

What is claimed is:

1. An efficient method for localizing leaks in water supply pipe networks based on valve operations and online water metering, wherein, existing valves in a district metering area DMA are decomposed into two sub-areas by closing valves following an optimal strategy, and the sub-area containing leaks is identified from online water balance analysis based on smart demand meters, thereby reducing the area containing leaks; the strategy of combining valve operations with water balance analysis is repeatedly implemented to gradually reduce the leaking area until no valve operation is capable of further reducing the leaking area;

wherein, the method further comprises steps of:
1) using a graph theory-based method to find out valve closing strategies $V_s = \{v_1, v_2, \ldots, v_N\}$; that is capable of decomposing the DMA into two sub-areas, which form a set $V = \{v_1, v_2, \ldots, v_S\}$; wherein, N is a total number of operable valves in the DMA, and S is a total number of obtained valve closing strategies; $v_n \in \{0,1\}$ represents the state of a valve n, 0 indicating being closed, and 1 indicating being open; decomposing the DMA into two sub-areas by the valve closing strategies $V_s$, which is expressed as $G = G_1(V_s) \cup G_2(V_s)$, in which G is a graph of the DMA, vertices in the graph represent node elements in the pipe network, edges represent link elements in the pipe network, and $G_1$ and $G_2$ represent the two sub-areas decomposed by closed valves of a valve closing strategy;
2) initiating the leak localization by marking all pipes in the DMA as potential leaking pipes, and setting a current stage of leak localization as k=1, leaks are assumed to locate at pipe sections with $x_m = 1$ representing the pipe section potentially have leaks and $x_m = 0$ representing no leaks exist at the pipe section; wherein, m=1, 2, ... M, M represents the total number of pipe sections in the DMA, and the cases of leaks at other components connected to the pipe sections are equivalent to those of leaks at pipe sections;
3) determining an optimal valve operation strategy at the current stage k by establishing an optimized objective function as follows,
minimization $$F^k = w_1 \frac{\sum_{n=1}^{N} |v_n^k - v_n^{k-1}|}{N} + w_2 \frac{\left| \sum_{i=1}^{G_1^P(V^k)} x_i^{k-1} L_i - \sum_{j=1}^{G_2^P(V^k)} x_j^{k-1} L_j \right|}{\sum_{m=1}^{G(P)} L_m} \quad (1)$$

constraints:

valve closing strategy: $v_n^k \in \{0,1\} n=1,2,\ldots,N$ (2)

decomposing the DMA into two sub-areas: $G = G_1(V^k) \cup G_2(V^k)$ (3)

pressure constraints at uninterrupted users:
$H_u(V^k) \geq h_u^{min}$ (4)

where, $\sum_{n=1}^{N}|v_n^k-v_n^{k-1}|$ represents the number of valve operations at the current stage k (relative to the valve state at a previous stage k−1), comprising valve opening and closing; $\sum_{n=1}^{N}|v_n^k-v_n^{k-1}|/N$ represents normalization of valve operations; $L_m$ represents a length of the pipe section m; $|\sum_{i=1}^{G_1^P(V^k)}x_i^{k-1}L_i-\sum_{j=1}^{G_2^P(V^k)}x_j^{k-1}L_j|$ represents a length difference between the potential leaking pipes in the two sub-areas decomposed by the valve closing strategy $V^k$, $\sum_{m=1}^{G(P)}L_m$ represents the total length of the pipe section in the DMA; $|\sum_{i=1}^{G_1^P(V^k)}x_i^{k-1}L_i-\sum_{j=1}^{G_2^P(V^k)}x_j^{k-1}L_j|/\sum_{m=1}^{G(P)}L_m$ represents normalization of the length difference; and $w_1$ and $w_2$ represent weights of the number of valve operations and the length difference between the potential leaking pipes in the two sub-areas, respectively;

4) closing or opening the valves according to the optimal valve closing strategy, and decomposing the DMA into two sub-areas: for the two sub-areas, one contains at least an inlet of the DMA, that is, the sub-area functions normally, and the other one functions normally, or is isolated by closed valves, that is, water supply is interrupted;

5) optionally selecting a sub-area that functions normally to perform online water balance analysis, in order to identify whether this sub-area has leaks; wherein, if it is identified having no leaks, the leaks are located in another sub-area; the online water balance analysis is implemented through boundary flowmeters of the DMA and smart demand meters at end users; the difference between the flow entering the selected sub-area and user's water consumptions in the selected sub-area, that is, non-revenue water NRW, which indicates whether there are leaks in the selected sub-area; if the value of NRW of the selected sub-area is similar to that of the NRW of the DMA before leak localization, it indicates that there are leaks in the selected sub-area; otherwise, the leaks are located in another sub-area;

6) updating the potential leaking pipes of the current stage k by marking the pipe sections in the sub-area that has been identified having no leaks as pipe sections with no leaks, that is, $x^k=0$, so as to reduce the leaking area;

7) judging whether there is any valve operation in the DMA to further reduce the leaking area, if so, returning to step 3) for the next stage of leak localization, that is, k=k+1, otherwise, which indicates that a minimum leaking area has been identified, terminating the leak localization process; and 8) dispatching workers to accurately pinpoint the leak locations in the identified leaking area and then repair the localized leaks.

2. The efficient method for localizing leaks in water supply networks based on valve operations and online water metering according to claim 1, wherein, the step 1) specifically comprises steps of:

(1) removing all edges representing valves in the pipe network graph G and identifying all connected subgraphs in the generated new graph, wherein the subgraphs represent the smallest areas in the pipe network that are isolated by closing valves;

(2) transforming the pipe network graph G into a new alternative graph $G_V$, wherein the valves in the pipe network are taken as edges and all the connected subgraphs identified in step (1) as vertices, and the new alternative graph $G_V$ is constructed according to a topological connection relationship between the valves and the connected subgraphs;

(3) determining cut sets of the alternative graph $G_V$, wherein each cut set represents a valve closing strategy $V_s$, and edges in the cut set represent valves to be closed in the valve closing strategy, namely, $v_n=0$; forming a set of valve closing strategies V by converting each cut set V into a valve closing strategy.

3. The efficient method for localizing leaks in water supply networks based on valve operations and online water metering according to claim 2, wherein, in the step (3), the cut sets of the alternative graph $G_V$ are determined by the Contraction algorithm of the Karger algorithm, specifically by: randomly selecting an edge in the graph to be removed, merging two endpoints of the edge, and reserving other connecting edges of the endpoints; repeating the process until there are only two endpoints left in the graph, at which time the connecting edge of these two remaining endpoints is a cut set of the graph; Obtaining a sufficient number of cut sets by repeatedly executing the Contraction algorithm for $t^4 \log t$ times, where t is the total number of vertices in the graph $G_V$.

* * * * *